United States Patent [19]

Sanders

[11] 4,194,278

[45] Mar. 25, 1980

[54] BROADHEAD AND FIELD POINT EXTRACTOR TOOL

[76] Inventor: Fletcher T. Sanders, 2147 E. Southern, Phoenix, Ariz. 85040

[21] Appl. No.: 927,652

[22] Filed: Jul. 24, 1978

Related U.S. Application Data

[63] Continuation-in-part of Ser. No. 563,791, Mar. 31, 1975, abandoned.

[51] Int. Cl.$^2$ .............................................. B23P 19/04

[52] U.S. Cl. ...................................................... 29/264

[58] Field of Search .................. 29/256, 263, 269, 264

[56] References Cited

U.S. PATENT DOCUMENTS 720,622 2/1903 Rosenthal ............................. 29/264

*Primary Examiner*—James L. Jones, Jr.

*Attorney, Agent, or Firm*—William H. Drummond

[57] ABSTRACT

A tool is disclosed for the extraction of broadhead and field point arrowheads from objects in which they are embedded by removing the shaft from the arrowheads, securing the extractor tool directly onto an embedded arrowhead, and applying pressure so as to draw the arrowhead directly out of the object in which it is embedded.

1 Claim, 6 Drawing Figures

FIG. 1
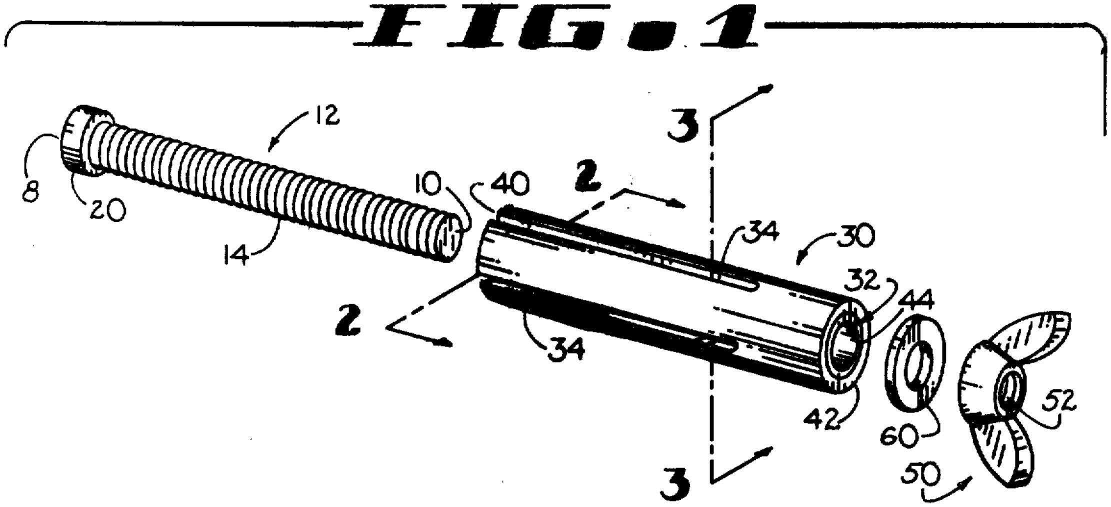
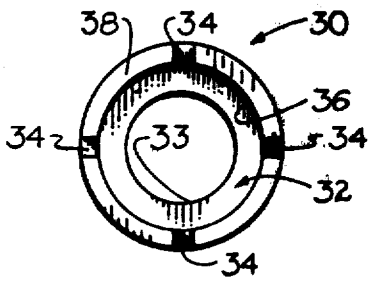
FIG. 2
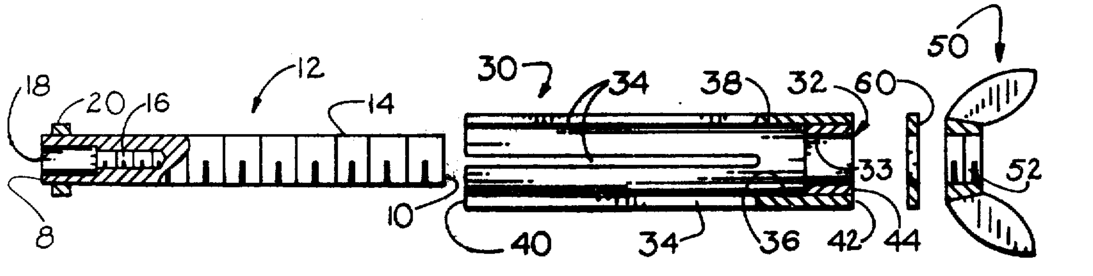
FIG. 3

FIG. 4
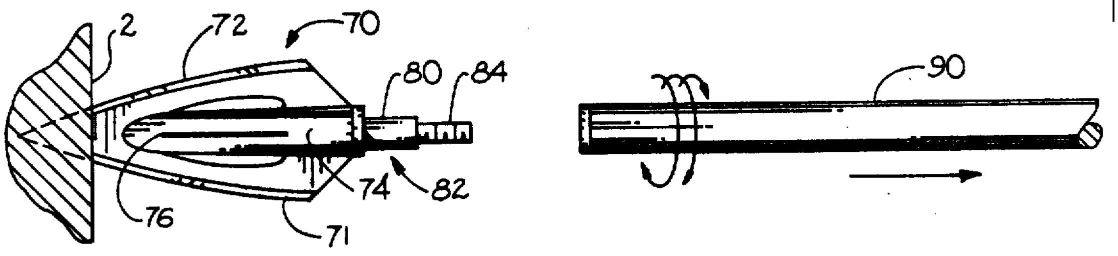
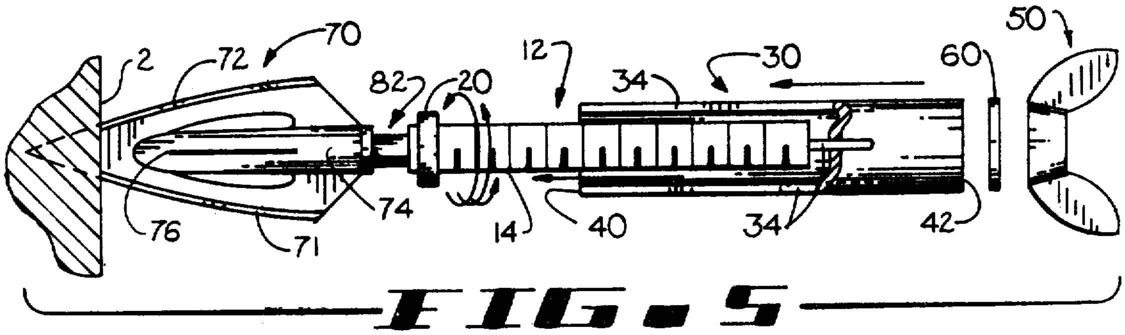
FIG. 5
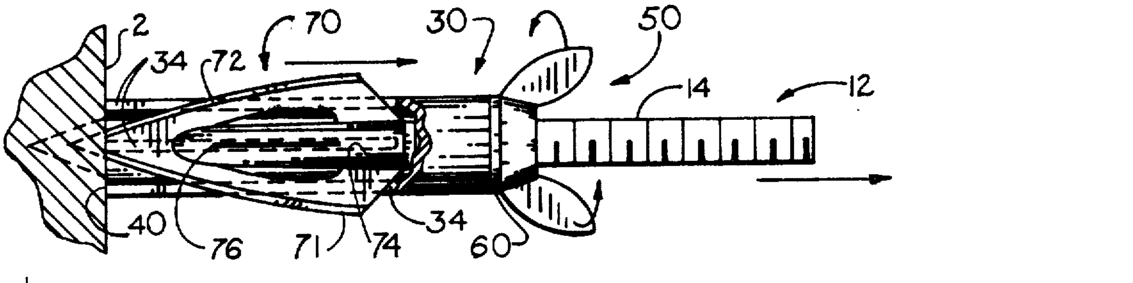
FIG. 6

BROADHEAD AND FIELD POINT EXTRACTOR TOOL

BACKGROUND OF THE INVENTION

Related Application

The invention herein is that taught in application Ser. No. 563,791 filed Mar. 31, 1975, now abandoned.

Field of the Invention

This invention relates to hand extractor tools, but is designed with peculiarities for withdrawing embedded arrowheads from objects, either in open areas or closed areas.

Description of the Prior Art

In a typical situation, if an archer misses his target, there is a strong likelihood of the arrow impinging on a wooden object such as a tree tunk and becoming embedded therein.

The archer who has missed his target generally attempts to free the arrow from the wood by exerting a pull axially along the shaft of the arrow, or by using a knife to dig out the arrowhead. In most situations this has not been successful because the arrowhead is embedded too deeply. The archer may then unscrew the shaft from the arrowhead and leave the arrowhead embedded in the wood. But, it is more common for an archer to break the shaft of the arrow or bend it out of its trueness in his attempt to free the arrowhead from the wood. Since both the arrow shaft and the arrowheads represent a substantial investment in time and money, a lost arrowhead and shaft constitute a financial loss to the archer.

Arrowheads used by archers in the field are broadly categorized into two types: the broadhead, used for hunting purposes; and field points, used sometimes for hunting but mainly for target practicing. The field point is made of one piece of metal that has a short body with an extended portion that screws into the end of the shaft of an arrow. Broadhead arrowheads are made in at least two pieces, the blade or blade portions and an insert.

There are many types of broadheads but, for convenience, a typical broadhead will be described. The broadhead comprises a body that contains an insert with a threaded portion that secures the arrowhead to the shaft and a plurality of blades or blade portions, typically four. The blades generally comprise a wide primary double-edged blade, in a typical "arrowhead" configuration, and a smaller secondary blade, commonly called a bleeder blade, disposed substantially perpendicular to the primary blade. The secondary blade is attached to or inserts through the body portion of the arrowhead. The bleeder blade is usually a double-edged blade. The well known "razor head" arrowhead is illustrated herein as typical of a broadhead arrowhead.

SUMMARY OF THE INVENTION

The invention is a tool adapted for the extraction of broadhead and field point arrowheads from wood and other objects. The tool comprises means for exerting an outward pull directed along the axis of the body of the arrowhead so as to draw the arrowhead directly from the object in which it is embedded, without applying twisting or wrenching motions which might destroy the arrowhead. A rod is attached to the arrowhead and maintained in axial alignment therewith. A body housing is passed over the rod and arrowhead and caused to bear against the object in which the arrowhead is embedded. Simultaneously, a tension force is applied to the rod while a compressive force is applied to said body housing, the rod and arrowhead being maintained in axial alignment with the axis of the body housing along which the tension force is applied.

Among the objects of the present invention are the following:

to provide a new and useful arrowhead extractor tool;

to provide a new and useful extracting means for arrowheads embedded in wood or other objects;

to provide a new and useful tool for extracting embedded arrowheads by applying a force between the body disposed about the arrowhead and against the object in which the arrowhead is embedded.

Further expositions of my invention may be understood by the annexed drawings and specification, whereof my invention will be specifically pointed out and claimed.

BRIEF DESCRIPTION OF THE DRAWINGS

FIG. 1 is an exploded isometric view of the present invention.

FIG. 2 is an enlarged front end view of the present invention taken generally along the numerals 2—2 of FIG. 1 and looking in the direction indicated by the arrows.

FIG. 3 is a cut-out and sectional view of the inventive principles of the present invention taken generally along the numerals 3—3 of FIG. 1 and looking in the direction indicated by the arrows.

FIG. 4 is a pictorial view of an embedded broadhead arrowhead illustrating the removal of the shaft from the arrowhead.

FIG. 5 is a pictorial view of an embedded arrowhead illustrating the securing of the present invention onto the arrowhead.

FIG. 6 is a pictorial view of an embedded arrowhead illustrating the withdrawal of the arrowhead by the present invention.

DESCRIPTION OF A PREFERRED EMBODIMENT

The extractor tool is indicated by FIG. 1. FIGS. 2 and 3 bear the same general reference as that of FIG. 1. The inventive principles of the tool are designed for specific environmental requirements, for the extraction of embedded arrowheads from objects. Use of the tool is sequentially illustrated in FIGS. 4, 5 and 6.

The extractor tool comprises an elongated, hollow extractor body 30 with a first end 40 and a second end 42 which includes a plurality of elongated thin openings 34, a retainer instrument 32; an externally threaded 14 elongated annular extractor implement 12 with a first end 8 and a second end 10 includes a second annular retainer instrument 20, disposed about said end 8, an annular flat friction instrument 60 and a second cooperating compressive extractor instrument 50 with an internally threaded opening 52.

In FIG. 4, a broadhead arrowhead 70 is shown as a reference, indicating the removal of arrow shaft 90. The broadhead 70 comprises a primary double-edged blade 71 and 72, a cylindrical body 74, a double-edged bleeder blade 76 (the other not shown) inserted through the cylindrical body 74 and an insert 82 made of one piece, secured into the cylindrical body 74, including two reduced diameters 80 and an externally threaded portion 84.

A field point arrowhead is not shown but the field point has the same general principles as that of the extended mating portion 80 and 84 of the broadhead 70.

FIG. 3 shows the complete order of assembly of the inventive principles. The cut-out portion of the elongated co-operating extractor implement 12 exposes a set of bores 16 and 18 within the first end 8. The said bores are of two different diameters and depths, corresponding with the insert 82 of the broadhead 70. The bores 16 and 18 are disposed coaxially and concentrically with respect to the extractor implement 12.

The internally threaded bore 16 matches and engages onto the extended externally threaded portion 84 of the broadhead 70. A complete engagement must be made between the external threads 84 and the internally matched threads of the bore 16.

The second bore 18, by manner of drilling, is of equal importance for an axial withdrawal of the broadhead 70. The bore 18 is of sufficient size to assure and stabilize the proper alignment of the axes of the elongated extractor implement 12 and the broadhead 70, thus obviating any twisting, turning or bending of the broadhead.

Obviously, there may be different sizes in the diameter of the extended portion 80 and the reduced portion 84, thus the bores 16 and 18 will correlate accordingly.

The co-operating extractor implement 12 also includes an annular retainer instrument 20 disposed about the first end 8. The instrument 20 has a diameter somewhat larger than the extractor implement 12 but less than the interior opening 36 of the co-ordinator body 30, but yet slightly larger than the interior opening 33 of the second retainer instrument 32.

The diameter of the elongated implement 12 corresponds with the interior opening 33 of the second retainer instrument 32 disposed within the co-ordinator body 30. Annular retainer instrument 20 will prevent the extractor implement 12 from passing completely through the co-ordinator body 30.

The second end 10 of the elongated implement 12 that inserts through the opening 36 of the co-ordinator body 30 and the opening 33 of the retainer 32 communicates and engages into and onto a co-operating compressive force instrument 50, with a matched internally threaded opening 52.

The elongated body 30 and the elongated implement 12 are of size and length with respect to each other, to sufficiently allow the second end 10 of said implement 12 to extend outwardly and coaxially from the elongated body 30.

In FIG. 3, the elongated co-ordinator body 30 having a first bearing end 40 that bears against an object includes elongated thin openings 34 to accommodate the blade portions 71, 72, and 76 of the broadhead 70. The elongated openings 34 extending parallel with the axis of co-ordinator body 30 for about three-fourth of the entire length extending through wall thickness 38 and communicating with the interior opening 36 of the co-ordinator body 30 (best shown in FIGS. 1 and 2).

The elongated thin openings 34 will increase or decrease in number corresponding with the number of blades used with any given broadhead.

The wall thickness 38 must be understood to be sufficient to withstand the compressive force to be exerted between the bearing end 40 and the second bearing end 42. The second end 42 of the extractor co-ordinator body 30 comprises a bearing surface for the friction instrument 60 which, in turn, is a bearing surface for the compressive instrument 50.

The co-ordinator body 30 at said second end 42 includes a retainer instrument 32 disposed adjacent and flush with said end 42. The retainer instrument 32 has an external surface tangent to the interior surface opening 36 of the said body 30, secured thereto by an appropriate means such as crimping, cementing and etc. (see FIG. 3).

The retainer instrument 32 includes an interior opening 33, with respect to the elongated extractor implement 12, that will help in maintaining the alignment of the co-ordinator body 30 with the axis of the broadhead 70.

The outer edge 44 of the retainer instrument 32 adds to the bearing surface area of the second end 42 of the co-ordinator body 30.

With the understanding of the relationship exposed between each inventive principle of this invention, the withdrawal is accomplished by the removal of arrow shaft 90 and securing the first end 8 of the extractor implement 12 onto the externally threaded portion 84 of the insert 82 (see Illus. FIGS. 4 and 5). By placing the extractor body 30 over and onto the extractor implement 12, there the extractor body 30 is then moved axially along the elongated implement 12. Thus, the elongated slot openings 34 of the elongated body 30 will receive the blade portions 71, 72 and 76 of the broadhead 70 in order to allow the bearing end 40 of the elongated body 30 to bear against the outer surface of the object 2 shown in FIG. 6. Accordingly, the slotted elongated body 30 is there, disposed concentrically onto the co-operating extractor implement 12 and over the body 74 of the broadhead 70. The second end 10 of the co-operating extractor implement 12 will extend outwardly through the co-ordinator body 30 at its second end 42. The friction instrument 60 is placed onto the elongated extractor implement 12 and moved axially along the implement 12 and abuts the second end 42 of the co-ordinator body 30. This allows the threaded engagement between the external threads 14 of the extractor implement 12 and the internally threaded opening 52 of the compressive instrument 50. By turning and tightening the compressive instrument 50 against the end 42 of the elongated body 30, the first end 8 of the co-operating extractor implement 12 is drawn axially and outwardly into the co-ordinator body 30. The broadhead 70 is then drawn completely within the extractor body 30, with the blade portions 71, 72 and 76 substantially within the elongated openings 34. In this manner, the broadhead 70 (or field point) is substantially withdrawn from the object 2 as shown in FIG. 6.

While specific embodiments of the invention have been clearly exposed, described and illustrated in detail to the application of the inventive principles, it will be understood that the appended claims are intended to cover and embrace any and all modifications of structure, arrangements, proportions, and the elements and materials in the operative requirements, without departing from those principles within the true spirit and scope of the invention.

I claim:

1. In combination with an existing arrowhead, said arrowhead including, a body, and blades attached to and outwardly projecting from said body, a device for extracting said arrowhead from an object in which said arrowhead is embedded and for minimizing the probability said arrowhead will be bent while being extracted, said device comprising, (a) a rod detachably fixedly engaging said arrowhead such that the longitudinal axis of said arrowhead and of said rod are coaxial, (b) an elongate sleeve having, (i) a longitudinal axial bore sized to slidably receive said rod, and (ii) longitudinal slots equally spaced circumferentially about said sleeve, extending from one end of said sleeve receiving said blades of said arrowhead, and (c) means, engaging said rod, to simultaneously apply (i) a tensile force to said rod, and (ii) a compressive force to said sleeve such that said arrowhead is drawn from and said sleeve is forced against said object.

* * * * *